United States Patent
Craig

[11] Patent Number: 6,042,669
[45] Date of Patent: Mar. 28, 2000

[54] STRUCTURAL ELEMENT REPAIR WITH PARTLY FUSED WEBS

[76] Inventor: Hugh Craig, 1630 Fiske Pl., Oxnard, Calif. 93033

[21] Appl. No.: 08/624,310

[22] Filed: Mar. 26, 1996

Related U.S. Application Data

[60] Provisional application No. 60/020,456, Feb. 7, 1996.

[51] Int. Cl.[7] .................... B29C 73/06; B29C 73/10
[52] U.S. Cl. .................... 156/94; 156/98; 156/308.4; 156/309.6; 428/63
[58] Field of Search ................ 152/94, 95, 97, 152/98, 308.4, 309.6, 73.1; 29/402.11, 402.09; 428/63

[56] References Cited

U.S. PATENT DOCUMENTS

| | | | |
|---|---|---|---|
| 2,802,506 | 8/1957 | Agle | 156/97 |
| 3,448,784 | 6/1969 | Sons | 156/97 |
| 3,734,795 | 5/1973 | Griffith | 156/94 |
| 4,086,113 | 4/1978 | Cataffo | 428/63 |
| 4,090,897 | 5/1978 | Minick | 156/94 |
| 4,732,633 | 3/1988 | Pokorny | 428/63 |
| 4,824,500 | 4/1989 | White | 156/98 |
| 5,549,967 | 8/1996 | Gstrein | 156/148 |

*Primary Examiner*—Daniel Stemmer
*Attorney, Agent, or Firm*—Louis J. Bachand

[57] ABSTRACT

Polyolefin auto body components and like plastic structural elements having a predetermined form and a repairable damage discontinuity having an edge margin, are repaired by and covering the discontinuity with a web of differentially fusible portions, such as interdispersed differently fusible fibers, partially fused to the edge margin to support the web in place and provide a base for repair including application of repair adhesive.

12 Claims, 4 Drawing Sheets

FIG. 11

STRUCTURAL ELEMENT REPAIR WITH PARTLY FUSED WEBS

REFERENCE TO RELATED APPLICATION

This application claims the benefit of U.S. Provisional application Ser. No. 60/020,456, filed Feb. 7, 1996, converted from Ser. No. 08/598,086, filed Feb. 7, 1996 by petition dated Mar. 26, 1996, Express Mail No. EH315754646US.

TECHNICAL FIELD

This application relates to polyolefin auto body components and like plastic structural elements having a predetermined form, and their repair. Plastic structural elements having a repairable damage discontinuity bordered by an edge margin can be repaired in accordance with the invention by covering the discontinuity with a web of differentially fusible portions, such as differentially fusible interdispersed fibers, selectively fusing the web fusible portions to the edge margin, thereby to support the web in place and provide a base for repair such as application of repair adhesive. In particular, the invention relates to methods of polyolefin auto body component repair by the use of repair adhesives applied across a repairable area of damage supported by web which has been at least tack-adhered to the area edge margin by selective fusing one or more but not all of the portions or fibers making up the web to the component surface by application of heat from a common source. For example, non-fused fibers of the web can be entrapped in a fused mass comprising the component surface and fused fusible fibers. Maintaining their strength and integrity, the nonfused fibers and the unfused sections of the fused fibers support the web in repair adhesive receiving relation and enable quick and effective repairs of auto body components.

BACKGROUND OF THE INVENTION

Auto body components, such as fenders, bumper covers and other body panels, are increasingly fabricated of synthetic organic polymers, such as and particularly thermoplastic polyolefin plastics, sometimes referred to as TPO. Repair of these components requires techniques matched to their unique characteristics. While repair adhesives can be used to finish the repair of damaged areas of the components, the integration of the repaired area with the surrounding panel in a smooth, imperceptible manner requires that the repair material be effectively supported against waviness, protuberances and dishing. By its nature, polyolefin is only difficultly bonded to making support of the repair material problematical.

SUMMARY OF THE INVENTION

It is accordingly an object of the invention to provide a method of repair for autobody components formed of synthetic organic plastics such as TPO plastics. It is another object to provide such a method in which adhesive repair materials are supported at the damaged area by a web anchored to the edge margin bordering the damage locus. It is a further object to bridge gaps in the repair area with a web having dual fiber construction, including first portions such as first fibers adapted to bond with the TPO body panel so as to secure the web in place, and second portions such as second fibers which maintain web strength and integrity while the first fibers are bonded, as by ultrasonic fusing together of at least some of the first fibers and the edge margin surface. The second fibers may be embedded in the fusion product of the first fibers and the edge margin surface, for increased hold of the web to the edge margin. It is a still further object to support repair adhesive across the damage area locus with the web for finishing the repair. It is a further object to provide a repaired structural element such as a auto body panel. An additional object is to provide such elements with a repair in which the damaged area is bridged with a dual fiber web anchored to the area edge margins by a first fiber, and supported by the second fiber where the first fiber loses strength during fusion. Yet another object is the use of a plug to partially fill the damaged area, with the web being used about the perimeter of the plug and over the damaged area edge margin to support the plug in place. A still further object is to provide repair webs which comprise selectively fused webs in which the web fusible portion is fused to the web infusible portion to stiffen the web and enable repairs, e.g. in which a locking together of TPO sections, such as those split by a crack, is required.

These and other objects of the invention to become apparent hereinafter are realized in the method of repairing a structural element formed of heat fusible synthetic organic plastic and having damaged area bordered by an edge margin comprising the synthetic organic plastic, including cleaning the edge margin to receive a repair, and supporting at the edge margin a fibrous web having a first, heat fusible portion and a second, infusible portion comprising fibers, the web extending in repairing relation across the damaged area by selectively fusing the web second infusible fiber portion to the element edge margin with the web fusible first portion in contact therewith.

In this and like embodiments, the method further includes fusing the first fusible web portion with the second infusible web portion in web stiffening relation beyond the edge margin, selecting a web comprising graphite fiber as the web infusible portion, selecting polyolefin powder adhered to the graphite fibers as the web heat fusible portion, heating the polyolefin powder to its fusion temperature while leaving the web infusible fiber portion unfused, and surface heating the edge margin to its fusion temperature in contact with the polyolefin powder, whereby the fused polyolefin powder and the edge margin are fused together with the graphite fibers embedded in the edge margin to support the web across the damaged area, and/or selecting a polyolefin polymer as the synthetic organic plastic, heating the web first portion to its fusion temperature while leaving the web second portion fibers unfused, and surface heating the edge margin to its fusion temperature in contact with the web first portion, whereby the fused web first portion and the edge margin are fused together with the web second portion unfused fibers embedded in the edge margin to support the web across the damaged area.

The invention further provides the method of repairing a structural element formed of heat fusible synthetic organic plastic and having damaged area bordered by an edge margin comprising the synthetic organic plastic, including cleaning the edge margin to receive a repair, and supporting a fibrous web having first, heat fusible fibers and second, infusible fibers at the edge margin and in repairing relation across the damaged area by selectively fusing to the edge margin web first fibers in contact therewith.

In this and like embodiments, the invention includes also selecting a polyolefin polymer as the synthetic organic plastic, heating the web first fibers to their fusion temperature while leaving the web second fibers unfused, and surface heating the edge margin to its fusion temperature in contact with the first web fibers, whereby the fused web fibers and the edge margin are fused together with the unfused fibers embedded in the edge margin to support the web across the damaged area; removing loose debris and surface irregularities while cleaning the edge margin; securing the web to the edge margin to maintain contact therebetween; subjecting the web and the edge margin to a common heat source for heating the web first fibers and the edge margin to their fusion temperatures; fusing the fusible first fibers to the infusible second fibers in web stiffening relation beyond the edge margin; selecting ultrasonic energy as the common heat source; bringing the web and the edge margin into intimate contact while jointly heating the web and edge margin surface to web first fiber and edge margin fusion temperatures; selecting as the web first fiber at least one thermoplastic fiber fusion-compatible with the structural element plastic; selecting a polyolefin as the structural element plastic, and selecting for the web a polyolefin as the fusion compatible thermoplastic first fiber; selecting for the web as the second fiber at least one fiber which resists fusion at temperatures at which the structural element plastic fuses; selecting as the fusion resistant web second fiber a high temperature plastic, glass, carbon or mineral fiber having a melting temperature sufficiently above the fusion temperature of the structural element plastic that the fusion resistant second fiber maintains structural integrity at the fusion temperature of the structural element plastic; selecting a web comprising fibers of high temperature plastic, glass, carbon or mineral strands and polyolefin strands interdispersed throughout the web; selecting a web second fiber comprising commingled strands of high temperature plastic, glass, carbon or mineral and strands of polyolefin arranged into the web; selecting web second fibers of high temperature plastic, glass, carbon or mineral strands cowoven with polyolefin strand fibers into the web; partially filling the damaged area with a plug to which the web is partially fusible, the web being fused to the plug and to the edge margin in plug supporting relation for effecting damaged area repair; partially filling the damaged area with a plug to which the web is partially fusible, the web being fused to the plug and to the edge margin in plug supporting relation for effecting damaged area repair; selecting a pair of webs secured to each other, each web comprising strands of high temperature plastic, glass, carbon or mineral, or strands of thermoplastic fusion compatible fiber; selecting a polyolefin structural element fusible synthetic organic polymer plastic; and selecting a web comprising high temperature plastic, glass, carbon or mineral fibers and polyolefin fibers interfitted together in web defining relation, and inserting a polyolefin plug into the cleaned damaged area in advance of partly fusing the web.

In other embodiments, the invention includes selecting a polyolefin structural element plastic and a web in which second fibers of high temperature plastic, glass, carbon and mineral fiber and polyolefin first fibers are interwoven; and heating the polyolefin first fiber to fusion temperature in fusion contact with the polyolefin structural element edge margins while leaving the high temperature plastic, glass, carbon or mineral fibers intact to support the web on and beyond the edge margins.

In a preferred embodiment, the invention provides the method of repairing a vehicle body panel formed of heat fusible synthetic organic plastic and having a damaged area bordered by an edge margin comprising the synthetic organic plastic, including at least partially covering the damaged area and its edge margin with a fiber web of interdispersed first and second portions having different temperatures of fusion such that the first web portion is fusible completely at temperatures at which second web portion is infusible and remains unfused, heating the web in contact with the edge margin for a time and at a temperature to fuse the fusible web portion and the contacted edge margin with each other while leaving the infusible web portion embedded intact in the fusion products of the fusible first portion and edge margin.

In this and like embodiments, the invention includes subjecting the web and edge margin to a common heat source for heating for the time and at the temperature, subjecting the web and edge margin to ultrasonic energy in fusible web first fiber and edge margin fusing relation; bringing the web and the edge margin into intimate contact while jointly heating the web and edge margin surface to the temperature; selecting for the web as the first fusible portion at least one thermoplastic fiber fusion-compatible with the structural element plastic; selecting for the web as the first fusible portion at least one thermoplastic powder fusion-compatible with the structural element plastic; selecting a polyolefin as the vehicle body panel plastic, and selecting for the web as the first fusible portion a polyolefin fusion compatible thermoplastic fiber; selecting for the web as the second portion at least one fiber which is infusible at temperatures at which the polyolefin vehicle body panel fuses; selecting as the web infusible second portion a fiber comprising strands of high temperature plastic, glass, carbon, or mineral fiber having a melting temperature sufficiently above the fusion temperature of the polyolefin vehicle body panel that the infusible second fiber maintains structural integrity at the fusion temperature of the panel polyolefin; and selecting a web having a second portion comprising glass fibers and a first portion comprising polyolefin fibers interdispersed throughout the web in web-integrity maintaining relation upon fusion of the first portion fibers with the panel synthetic organic plastic.

In a further preferred embodiments the invention provides a structural element having a damaged area repair, the element having a fusible synthetic organic plastic edge margin about the locus of its damaged area, the damaged area repair comprising a fibrous web of infusible portions bonded together in situ by web fusible portion in web stiffening relation, and bonded to the damaged area edge margin.

In another preferred embodiment the invention provides a structural element having a damaged area repair, the element having a fusible synthetic organic plastic edge margin about the locus of its damaged area, the damaged area repair comprising a plastic plug substantially filling the locus, a fibrous web extending across the at least the portions of the locus not filled by the plug and secured to the plug and to the locus edge margin by selective fusion therewith of fewer than all of the fibers comprising the web.

In a further preferred embodiment the invention provides a structural element having a damaged area repair, the element having a fusible synthetic organic plastic edge margin about the locus of its damaged area, the damaged area repair comprising a fibrous web extending into the locus secured to the edge margin by selective fusion with the edge margin of fewer than all of the fibers comprising the web.

In this and like embodiments, the invention the selectively fused fibers of the web have a lower fusion temperature than other fibers comprising the web, the structural element comprises a polyolefin plastic and has a polyolefin edge margin, the selectively fused fibers comprising polyolefin, the fibrous web comprises first fibers of polyolefin and interdispersed therewith second fibers of glass, carbon, mineral or high temperature melting plastic, the polyolefin first fibers having a lower fusion temperature than the second fibers, whereby fusion of the first fibers with the structural element edge margin embeds the second fibers in the fusion product, at least one of the first and second fibers comprises strands of glass, carbon, mineral, or high temperature melting plastic commingled with strands of polyolefin plastic, the polyolefin strands are the lowest melting temperature strands in fibers having the commingled strands and are present in an amount sufficient to fusion tack the polyolefin strand-containing fiber to the structural element edge margin, there is also included a coating of an adherent repair material on the web to fill the damaged area locus, the web comprises a first fiber of at least one thermoplastic fiber fusion-compatible with the structural element plastic, and a second fiber which resists fusion at the fusion temperature of the first fiber, the structural element comprises polyolefin plastic, and the web comprises a polyolefin first fiber, the web second fiber comprises a high temperature plastic, glass, carbon or mineral fiber having a melting temperature sufficiently above the fusion temperature of the structural element plastic that the fusion resistant second fiber maintains structural integrity at the fusion temperature of the structural element plastic, the web comprises fibers of high temperature plastic, glass, carbon or mineral strands and polyolefin strands commingled into single fibers, the single fibers being formed into the web, the web comprises first fibers of polyolefin strands and second fibers of high temperature plastic, glass, carbon or mineral strands cowoven with the polyolefin fibers to form the web, the web comprises a polyolefin structural element-fusible synthetic organic polymer plastic interfitted with high temperature plastic, glass, carbon or mineral fibers in web defining relation, the structural element plastic comprises polyolefin plastic, and the web comprises interwoven first fibers comprising polyolefin and second fibers comprising high temperature plastic, glass, carbon or mineral, and/or the polyolefin first fiber is fused locally at the edge margin, the second fiber is unfused at the edge margin and embedded in the edge margin and fused first fiber, the web beyond the edge margin comprising unfused first and second fibers in mutually supporting relation.

In a still further embodiment the invention provides a structural element comprising a vehicle body panel formed of heat fusible synthetic organic plastic and having a damaged area bordered by an edge margin comprising the synthetic organic plastic, a web at least partially covering the damaged area and its edge margin comprising interdispersed first and second fibers, the first web fibers being fused to the edge margin, the second fibers being held intact in the fusion products of the fused first fibers and edge margin.

In this and like embodiments, the first fiber comprises at least one thermoplastic fiber fusion-compatible with the structural element plastic, the vehicle body panel plastic is a polyolefin and the web first fiber comprises a polyolefin fusion compatible thermoplastic fiber, the web second fiber comprises at least one fiber which is infusible at temperatures at which the polyolefin vehicle body panel fuses, the infusible web second fiber is a fiber comprising strands of high temperature plastic, glass, carbon, or mineral having a melting temperature sufficiently above the fusion temperature of the polyolefin vehicle body panel that the infusible second fiber maintains structural integrity at the fusion temperature of the panel polyolefin, and/or the web comprises glass second fibers and polyolefin first fibers interdispersed throughout the web.

In a further embodiment, the invention provides a laminate of a dual fiber web in which the fibers differ in their fusion temperature and a repair adhesive, the repair adhesive comprising a polymer having repeating urethane linkages.

BRIEF DESCRIPTION OF THE DRAWINGS

The invention will be further described in conjunction with the attached drawings in which.

DESCRIPTION OF THE PREFERRED EMBODIMENTS

As noted above, the present invention overcomes the problem of support for repair adhesive when repairing body panel damage. In accordance with the invention the repair adhesive, typically a curable resin such as epoxy, urethane, acrylic, acrylate resins, or a thermoplastic resin, or the like is placed in the damaged area locus and cured in place after rough shaping to the desired height and contour. Where the width and length of the damaged area is too great to bridge, the adhesive must be supported. In the invention, this support reaches new heights of ease. Working from the back or front of the panel to be repaired, eliminating to that extent the need to dismount the part, the repair locus is readily covered with a sufficient web to cross the gap defined by the damaged area or the damaged area less the plug used to partially fill the damaged area, and with simple thermal tacking the web is secured in place, suitably bellied to receive a quantity of repair adhesive which is then finished in the normal manner. Any fibers which remain visible about the perimeter of the repair area are trimmed off before finishing the repair. All that is needed to accomplish the present method is a web having differentially fusible portions such as a graphite fiber defining an infusible portion and a powder plastic coating thereon defining a fusible portion, or a dual fiber web in which one set of fibers are fusible at a temperature at which other web fibers are not fused. The term web herein refers to a laterally and longitudinally extended, generally planar, construction comprising interconnected web fibers. Web fibers herein refers to elongate forms of self-supporting material, i.e. material which will not tear or part of its own weight when suspended. Suitable fiber materials include glass, including fiberglass roving and fibers, high temperature plastic such as the fiber-forming forms of the thermoplastic engineering plastics, such as polycarbonate, polyacetal, polysulfone, and the like, cross-linked versions of lower temperature melting plastics such as polyolefins like polyethylene, polypropylene, and the like, polystyrene and copolymers of olefins with themselves and other monomers, mineral fibers including glass and metals, and carbon fibers. Generally this listing may be considered to refer to those fibers herein referred to as infusible fibers, i.e. fibers which do not fuse or melt at temperatures at while other fibers, called fusible fibers herein, will fuse or melt, i.e. soften to the point of being non-self-supporting as defined above. Fusible fibers herein are typically fibers of low melting polyolefin plastic such a non-crosslinked polyethylene and polypropylene. The absolute fusion temperature of the fibers is less critical than the use of a web containing relatively fusible and relatively infusible fibers for a given, predetermined temperature. The temperature to be used is selected depending on the need to fuse to some degree the TPO panel and at the same time fuse one and not both (or all if more than two) of the fibers constituting the web. Thus at the given temperature, a fiber melting to fusion condition at that temperature is selected and paired with a second, high temperature melting fiber.

These different fibers are interdispersed in the webs used herein. By interdispersed is meant that the fibers extend through one another in web forming relation, i.e. form a coherent, flexible mass, and may be woven or interwoven with each other, e.g. in an over-under pattern, pressed together and bonded with or without interweaving and/or the use of external bonding aids. Separate webs, one of fusible fiber and another of infusible fiber, can be used where the webs are interconnected so as to act as a single layer web. However the web is achieved, it is characteristic that the fibers bind on one another such that the web is not readily pulled apart into individual fibers. The web thus can be supported when certain of its fibers have been fused, by the other nonfused fibers. The moment of fusion is transitory and the fused fibers will regain strength when cooled to room temperature, but for purposes of anchoring the web to the edge margin of the repair locus the web fibers which are relatively fusible will be reduced to fusion and thus have no particular strength. At that time the other, infusible fibers must carry the weight of the web. The fused fibers when melted will tack the web by their fusion products to the panel substrate which itself becomes fused in certain embodiments of the invention. The terms "having structural integrity" and/or "being intact" are used herein to describe the condition of the infusible fibers during the fusion step, because these infusible fibers, unlike the fusible fibers do not soften to fusion or melt but retain their shape and the strength sufficient to support their own weight and the weight of the web as well. The fusible fibers beyond the immediate fusion area also retain their structural integrity and intactness even when their terminal portions in contact with the repair area edge margin lose such due to fusion.

In certain cases, the web will desirably be hardened or stiffened before use or upon use across some, most or all of the extent of the web, regardless of the presence or absence of the edge margins. To accomplish this the web is heated across the desired extent, the fusible portion of powder or fusible fiber fuses the infusible fibers together stiffening the web. This web can now be used as a repair for cracked structural elements by adhering the walls bordering the crack to the stiffened web after closing up the crack, using the web strength to maintain the crack closed.

Figure 1:
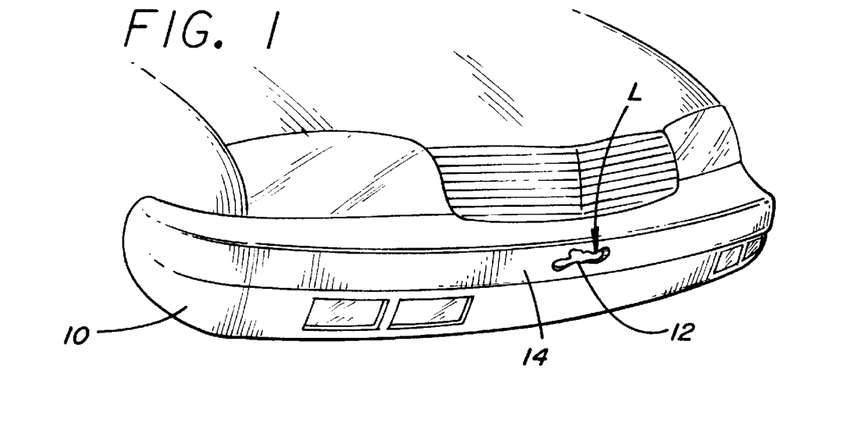
FIG. 1 is a perspective view of an auto body panel, specifically a fender cover, with a damaged area.

With reference now to the drawings in detail, a typical repair situation is shown in FIG. 1. A car bumper cover panel 10 of TPO has been damaged with loss of a section in the damaged area 12. Typically, the wall 14 of the panel 10 is about ⅛ inch thick. The locus of damage, indicated as L, is cleaned of debris and cut into auniform shape, here oval 16. See FIG. 2. The sidewalls of oval 16 are beveled to provide an edge margin 18 of TPO which will be the situs of the web attachment.

Figures 2, 3:
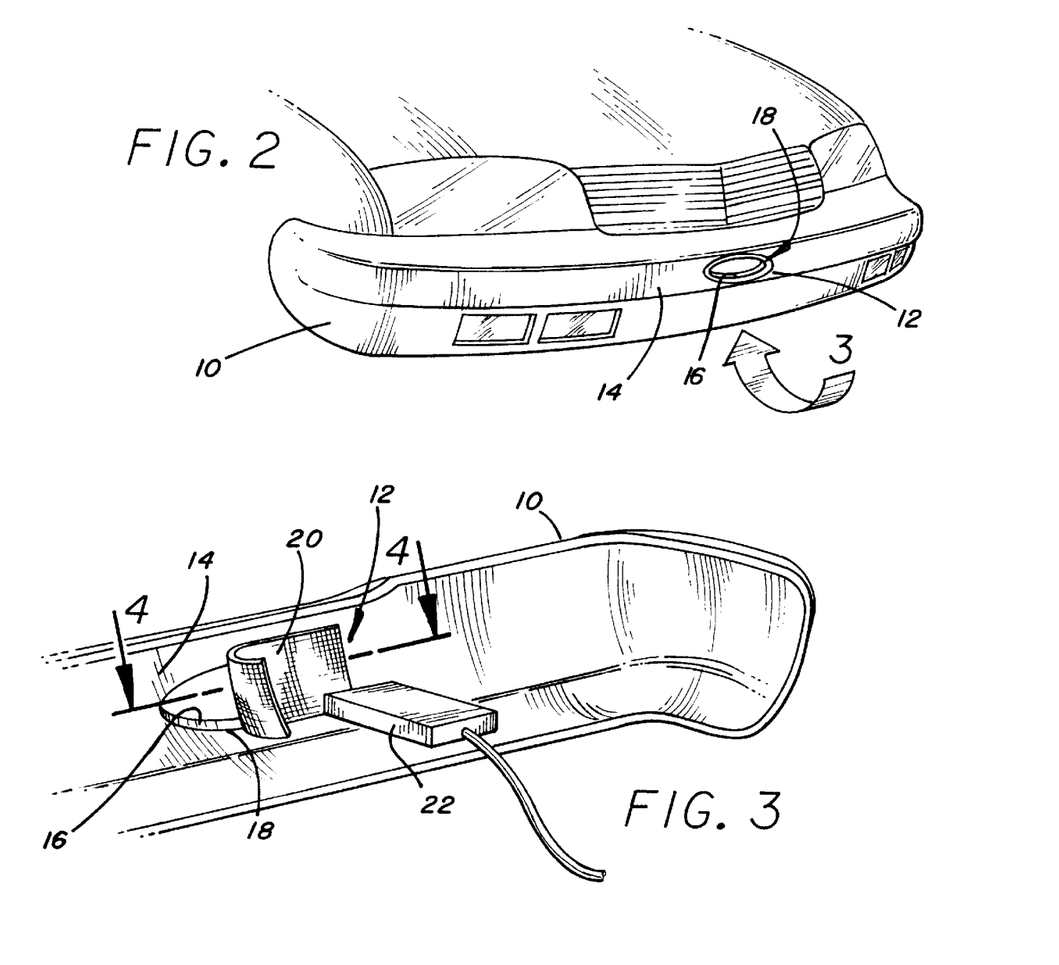
FIG. 2 is a view like FIG. 1 in which the damaged area has been cleaned, and edge margin beveled and made uniform.
FIG. 3 is a view of the damaged area with the repair web being applied.

Referring to FIG. 3, the web 20 comprising, preferably, a woven cloth of polyolefin fibers as the fusible fibers and glass fibers as the infusible fibers is applied to the damaged area 12. These different fibers can be cowoven i.e. woven together in adjacent and even alternate rows so that the web comprises in both the warp and woof direction rows of glass fiber spaced by adjacent rows of polyolefin fibers. Or, the fibers can be of the commingled type, i.e. each fiber is composed of both glass and polyolefin strands and these fibers are interdispersed, as by weaving, into a web. The web 20 is brought into contact with the edge margin 18 and heat is applied such as by ultrasonic means 22 for a time and at a temperature such that the fusible fibers and the edge margin 18 TPO material momentarily fuse, joining together in a manner at least tacking the web to the structure edge margin. Importantly, in the process of tacking the web 20 by its perimeter fibers the web is nonetheless strong by virtue of the other, nonfusible fibers retaining their strength and position. Certain of the infusible fibers may be embedded in the fusion products of the fusible fibers and the edge margin plastic thus further enhancing the attachment of the web 20 to the structure in a manner such that the web extends into and typically covers the oval 16 which is the locus of damage. In the absence of the ability of the web 20 to partly fuse, while remaining unfused generally, it would not be possible to heat-adhere the web to the edge margin 18 effectively since the fused webs, until cooled, will have no strength to maintain the balance of the web inward of its perimeter supported over a void such as the oval 16.

Figure 4:
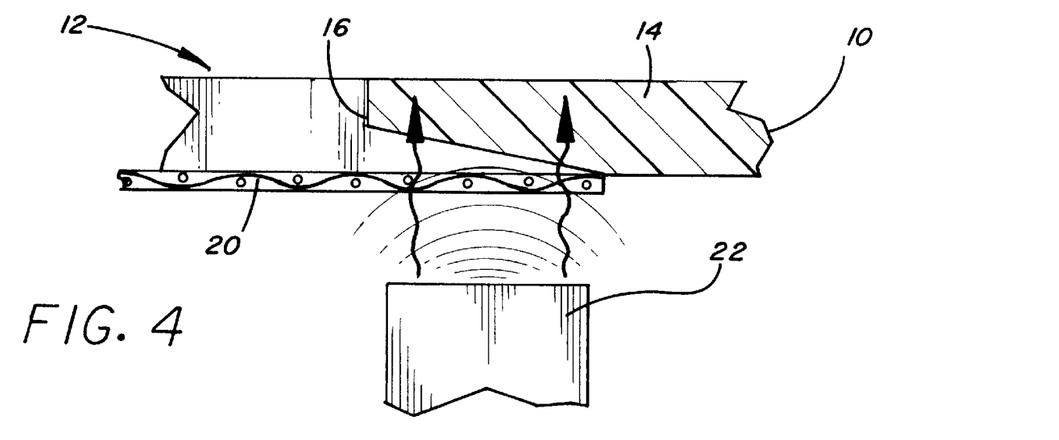
FIG. 4 is a horizontal sectional view of the application step.
Figure 5:
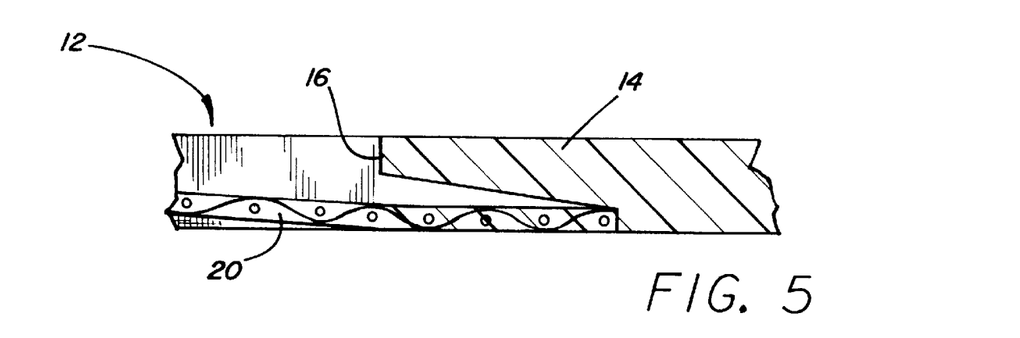
FIG. 5 is view like FIG. 4, but after the application step.
Figure 6:
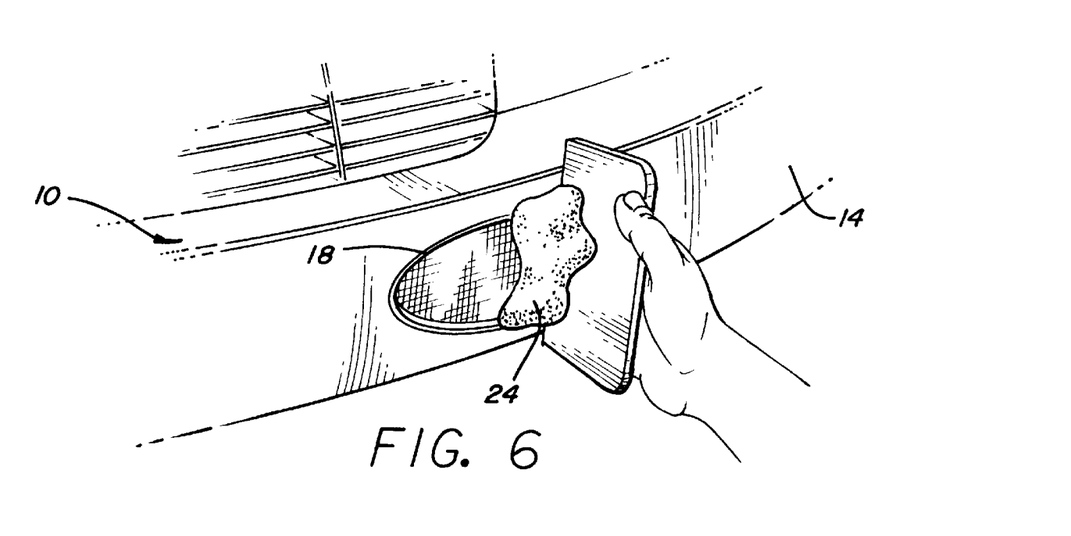
FIG. 6 is a view showing application of the repair adhesive.
Figure 10:
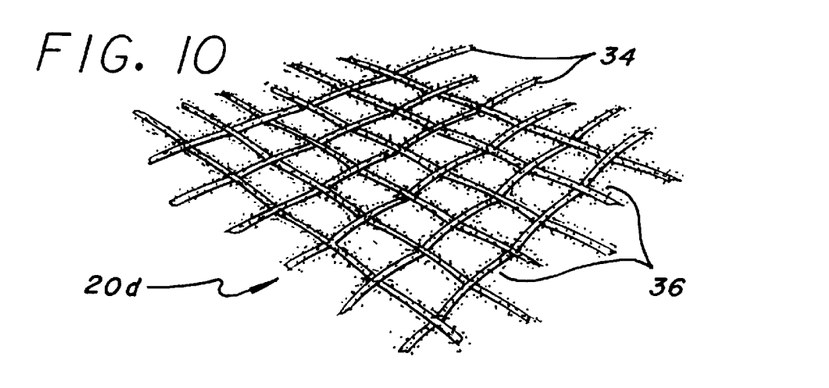
FIG. 10 is a detail view of a powdered polyethylene coated graphite fiber web.

As shown in FIG. 3 the web 20 is cut to generally fit congruently onto the oval edge margins 18, and is thermally tacked in place as shown in FIGS. 4–6. Unduly protruding fibers are trimmed away. With further reference to FIG. 6, a repair adhesive 24 is spread over the web 20 to fill the oval 16, supported by the web and covering the web fibers. Repair adhesive 24, known per se, is rough contoured in place, smoothed and allowed to set up, then sanded to conform to the shape of the panel wall 14 as though there had been no damage.

Where the damaged area 12 is extensive a plug 30 cut to substantially, if partially, fill the damaged area is first inserted, and as inserted is supported in place by fusing the web 20 to both the edge margin 18 and the plug surface 32, as shown in FIG. 10, by selective fusing of the fusible portion of the web as described above.

Figure 7:
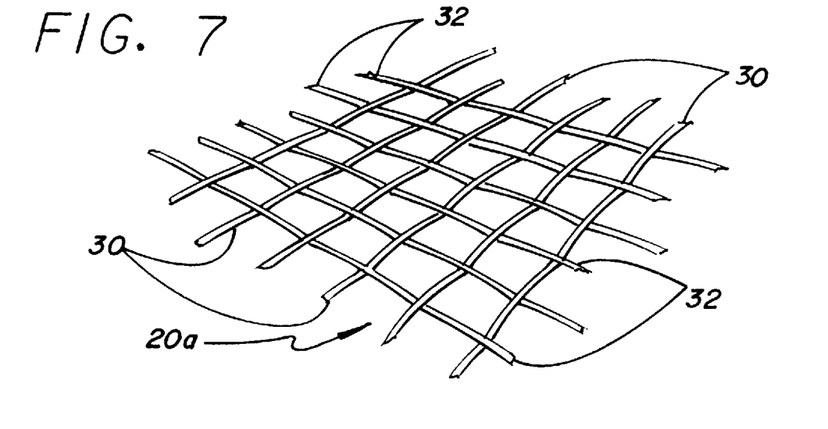
FIG. 7 is a fragmentary view of a cowoven mat.
Figure 8:
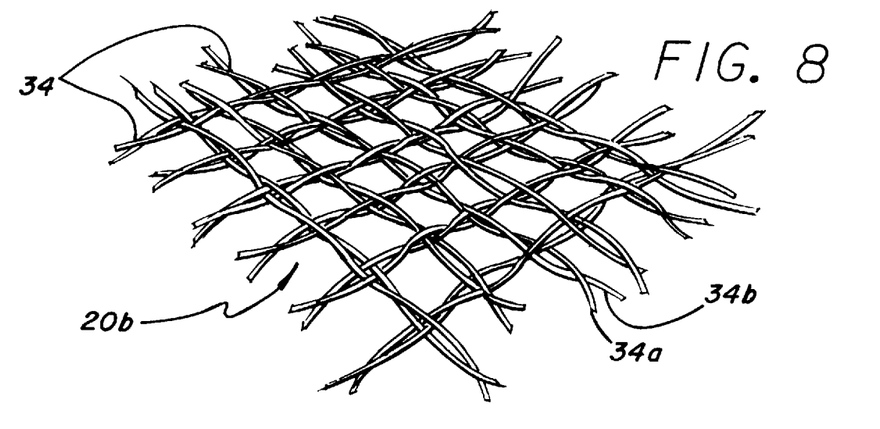
FIG. 8 is a detail view of a mat formed of fiber with commingled polyolefin and glass strands.
Figure 9:
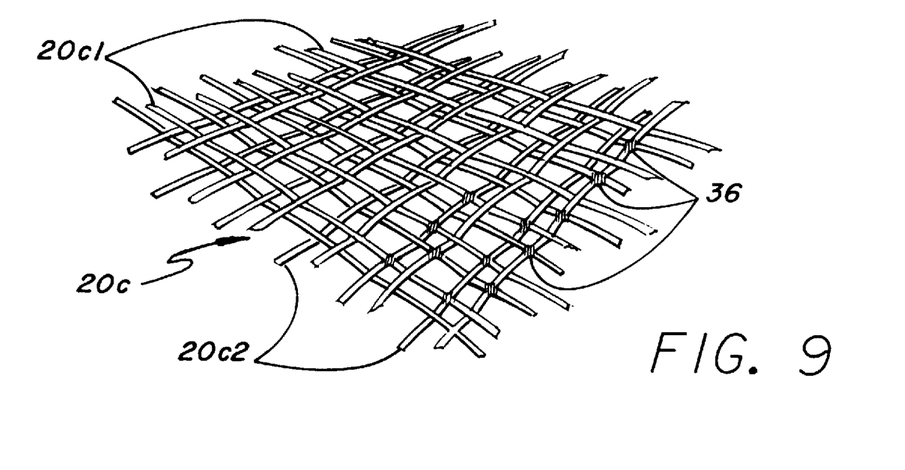
FIG. 9 is a detail view of a pair of interconnected webs each of a different fusion temperature fiber.

In FIG. 7 the cowoven form of web 20 useful in the invention is shown as web 20a which comprises polyolefin fusible fibers 30 and interwoven therewith infusible glass fibers 32. In FIG. 8, a further form of web 20 is shown as web 20b where the interwoven fibers 34 each comprise polyolefin fusible strands 34a and glass, metal, carbon or high temperature plastic infusible strands 34b commingled in each fiber. In the use of such a web 20b the fusion of the fusible strands acts to tack the web to the edge margin 18. In FIG. 9, web 20c comprises an upper web 20c1 and a lower web 20c2 which are bound together by infusible fibers 36. The fibers of web 20c1 are all fusible polyolefin, and the fibers of web 20c2 are all infusible fibers as above identified. In the use of web 20c, the upper web 20c1 fuses to tack the lower web 20c2 to the edge margin 18.

Figure 11:
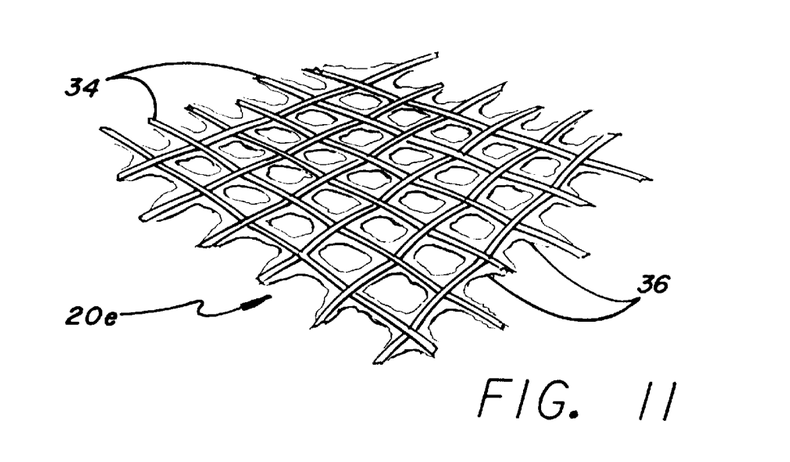
FIG. 11 is a view of the structure of FIG. 10 after fusing the powdered coating.
Figure 12:
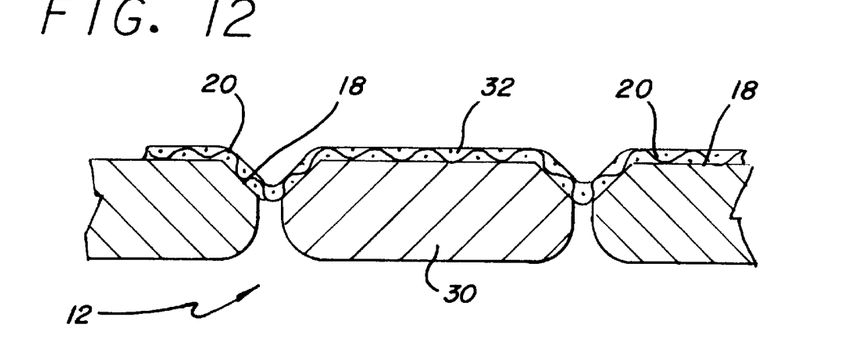
FIG. 12 is a view in vertical section of a repair with a plug and web used together.

In FIGS. 10 and 11, a web 20*d* is shown comprising graphite fibers 34 and powdered plastic 36 adhered thereto, e.g. by electrostatic deposition, before fusing of the powder, FIG. 10, and after, FIG. 11, where the powdered plastic such as polyethylene has been fused selectively and as fused adheres the graphite fibers to one another forming a denser, stiffer web 20*e* which can be used for crack repair as mentioned above.

EXAMPLE 1

A TPO structural element with a 2" diameter hole was repaired by first beveling the hole edges with a grinder and cleaning the resultant sloping edge margin. A fill piece of TPO was inserted as a plug into the hole after beveling to mate with the hole. A soft, flexible web, 10 ounce per linear yard weight and of plain weave with strands of polypropylene and glass commingled into fibers and then the fibers woven together, was cut to cover the repair area and applied with nestling into the groove between the plug and the hole perimeter. The fabric web fill plug and structural element were simultaneously heated to fuse portions of the fibers of the web to the TPO parts by applying a hand-held ultrasonic welding device to the fabric web in the joint between the TPO element and the fill plug and activating at the cardinal points until the web was tacked. Additional application of the ultrasonic machine about the circumference of the repair area resulted in full fusing of the polyolefin fibers of the web to the edge margin. The damaged area was then cosmetically restored using Duramix repair adhesive, ex Polymer Engineering Corp., per the manufacturer's directions. To evaluate the quality of the repair, after curing, the structural element panel was flexed along an axis through the repair area, bent across the repair area and struck repeated impacts with no damage being observed.

EXAMPLE 2

Following the procedure of Example 1, a repair is effected of a like 2" diameter hole using only the web to bridge the gap in the element. Tacking to the damage area edge margin supported the web across the gap with the repair adhesive in place until cured. Repair quality upon testing is equivalent to that obtained in Example 1.

EXAMPLE 3

Following the procedure of Example 1, but using a cowoven fabric comprised of poly propylene and carbon (graphite) fibers having a square weave and a 20 ounce per linear yard weight, ex Textile Fiber Corp., a repair is effected on simulated damage. Results are equivalent to those of Example 1.

EXAMPLE 4

Example 1 is repeated using Twintex, a commingled fabric of fusible and infusible fibers, ex Certainteed Corp., and a repair adhesive comprising the urethane reaction product of an aromatic isocyanate prepolymer, a hydroxyl functional moiety, and an aromatic isocyanate reactive with aliphatic amines. These compositions and other suitable adhesive repair compositions are disclosed in U.S. Pat. Nos. 4,869,400, 4,677,157, 5,082,147, and 5,166,301. Results are equivalent.

The invention thus provides a method of repair for autobody components formed of synthetic organic plastics such as TPO plastics in which adhesive repair materials are supported at the damaged area by a web anchored to the edge margin bordering the damage locus. Gaps in the repair area are bridged with a web having dual fiber construction, including first fibers adapted to bond with the TPO body panel so as to secure the web in place, and second fibers which maintain web strength and integrity while the first fibers are bonded, as by ultrasonic fusing together of at least some of the first fibers and the edge margin surface, and if desired second fibers may be embedded in the fusion product of the first fibers and the edge margin surface, for increased hold of the web to the edge margin. The repair adhesive is supported across the damage area locus by the web for finishing the repair on the structural element such as a auto body panel, such that the structural element damaged area is bridged with a dual fiber web anchored to the area edge margins by a first fiber, and supported by the second fiber where the first fiber loses strength during fusion.

The foregoing objects of the invention are thus met.

I claim:

1. Method of repairing a vehicle body panel formed of heat fusible synthetic organic plastic and having a damaged area bordered by an edge margin comprising said synthetic organic plastic, including at least partially covering the damaged area and its edge margin with a fiber web of interdispersed first and second portions having different temperatures of fusion such that said first web portion is fusible completely at temperatures at which said second web portion is infusible and remains unfused, heating said web in contact with said edge margin for a time and at a temperature to fuse the fusible web portion and the contacted edge margin with each other while leaving the infusible web portion embedded intact in the fusion products of said fusible first portion and edge margin.

2. The method according to claim 1, including also subjecting said web and edge margin to a common heat source for heating for said time and at said temperature.

3. The method according to claim 2, including also subjecting said web and edge margin to ultrasonic energy in said fusible web first fiber and edge margin fusing relation.

4. The method according to claim 1, including also bringing said web and said edge margin into intimate contact while jointly heating said web and edge margin surface to said temperature.

5. The method according to claim 1, including also selecting for said web as said first fusible portion at least one thermoplastic fiber fusion-compatible with said structural element plastic.

6. The method according to claim 1, including also selecting for said web as said first fusible portion at least one thermoplastic powder fusion-compatible with said structural element plastic.

7. The method according to claim 1, including also selecting a polyolefin as said vehicle body panel plastic, and selecting for said web as said first fusible portion a polyolefin fusion compatible thermoplastic fiber.

8. The method according to claim 7, including also selecting for said web as said second portion at least one fiber which is infusible at temperatures at which said polyolefin vehicle body panel fuses.

9. The method according to claim 7, including also selecting as said web infusible second portion a fiber comprising strands of high temperature plastic, glass, carbon, or mineral fiber having a melting temperature sufficiently above the fusion temperature of said polyolefin vehicle body panel that said infusible second fiber maintains structural integrity at the fusion temperature of said panel polyolefin.

10. The method according to claim 1, including also selecting as said web a web having a second portion comprising glass fibers and a first portion comprising polyolefin fibers interdispersed throughout said web in web-integrity maintaining relation upon fission of said first portion fibers with said panel synthetic organic plastic.

11. Method of repairing a structural element formed of heat fusible synthetic organic plastic and having damaged area bordered by an edge margin comprising said synthetic organic plastic, including cleaning said edge margin to receive a repair, and supporting a fibrous web having first, heat fusible fibers and second, heat infusible fibers at said edge margin, partially filling said damaged area with a plug to which said web is partially fusible, said web being fused to said plug and to said edge margin in plug supporting and damaged area repairing relation across said damaged area.

12. Method of repairing a structural element formed of heat fusible synthetic organic plastic and having damaged area bordered by an edge margin comprising said synthetic organic plastic, including cleaning said edge margin to receive a repair, and supporting a fibrous web having first, heat fusible fibers and second, heat infusible fibers at said edge margin and in repairing relation across said damaged said damage area by selectively fusing to said edge margin web first fibers in contact therewith, selecting as said heat infusible fibers fibers comprising high temperature plastic, glass, carbon or mineral fibers and as said heat fusible fibers comprising polyolefin, said infusible and fusible fibers being interfitted together in web defining relation, and inserting a polyolefin plug into the cleaned damaged area in advance of partly fusing said web.

* * * * *